Patented Oct. 4, 1932

1,880,522

UNITED STATES PATENT OFFICE

CARL TAUBE, OF LEVERKUSEN-ON-THE-RHINE, GERMANY, ASSIGNOR TO GENERAL ANILINE WORKS, INC., OF NEW YORK, N. Y., A CORPORATION OF DELAWARE

PREPARATION OF DIAZO BATHS SUITABLE FOR THE PRODUCTION OF AZO DYESTUFFS ON THE FIBER

No Drawing. Application filed February 21, 1929, Serial No. 341,837, and in Germany February 25, 1928.

The present invention relates to an improvement in the art of producing azo dyestuffs on the fiber.

As is known, stable diazo compounds, insensitive to more elevated temperatures offer great interest in naphthol red dyeing, particularly on account of the convenient method of working.

According to the present invention, the condensation products of diazo compounds, containing no sulfonic and carboxylic-acid groups with a secondary amine of the formula

wherein $R_1$ and $R_2$ stand for alkyl, or cyclohexyl, or $R_1$ and $R_2$ jointly stand for a pentamethylene chain, for example dimethylamine, diethylamine, cyclohexyl-alkylamine, are used for producing azo dyestuffs on the fiber, especially on the vegetable fiber. The condensation products from the diazo compounds and the secondary amines are obtainable according to the process described by Bayer and Jaeger in Berichte der Deutschen Chemischen Gesellschaft, vol. 8, pages 148 and 893 and by Wallach in Liebigs Annalen der Chemie vol. 235, page 233, by diazotizing in the usual manner with hydrochloric acid and sodium nitrite an aminocompound, and adding slowly the diazo solution to a solution of the secondary amine, advantageously with the addition of a caustic alkali, while stirring, eventually with cooling. The new condensation products separate in a crystalline form, or in the form of oils which on cooling solidify. They are generally white to yellowish colored, crystallizing substances with a low melting point. The condensation products used for the purpose of my invention may be illustrated by the general formula

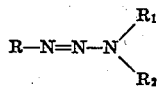

wherein R stands for a benzene residue containing no sulfuric acid and no carboxylic acid groups, and $R_1$ and $R_2$ stand for alkyl, or cyclohexyl, or $R_1$ and $R_2$ jointly stand for a penta-methylene chain.

All these compounds possess the important property of undergoing no decomposition in water or organic solvents, even at 100° C., while they are decomposed quantitatively into their constituents even by cold dilute acids and accordingly enable diazo solutions to be produced easily and quickly for technical purposes.

The dyeings are produced in the following manner: The material to be dyed is impregnated with a grounding liquor containing the coupling component, for example a 2.3-hydroxy-naphthoic acid arylide, β-naphthol or di-aceto-acetic-(tolidide) centrifugated or wrung out, and developed for about ½ hour in a diazo bath prepared from a condensation product of a diazo compound with a secondary amine, the dyed material is rinsed, soaped, rinsed and dried.

In dyeing 50 grams of cotton yarn, the grounding liquor is prepared by dissolving together about ½ gram to about 5 grams of the coupling component, about 1 to 10 ccm. of caustic soda lye of 34° Bé. and about 1 to about 10 ccm. of Turkey red oil of 50% strength and making up the whole with water to one liter.

The developing bath is prepared by acidifying about 1 gram to about 3 grams of the above identified condensation products with concentrated or diluted hydrochloric acid, for example by stirring with about 1 to about 3 ccm. of hydrochloric acid of 22° Bé., making up the mixture with water to one liter and neutralizing the same with sodium acetate, for example by the addition of about 4 to about 20 ccm. of a sodium acetate solution of 20% strength; if desired common salt may be added to the solution.

The following examples serve to illustrate my invention without limiting it thereto:—

*Example 1.*—4 grams of 2.3-hydroxynaphthoic acid-α-naphthalide are dissolved in the known manner with Turkey red oil and caustic soda lye to an aqueous solution of 1000 ccs. and 50 grams of cotton are impregnated in the customary manner with this solution for half an hour at about 30° C. The well centrifuged material is then developed in a bath, containing per liter 1.65 grams of the piperidine compound of diazotized meta-nitro-o-toluidine. The piperidine compound is dissolved by producing a paste of the same with a small amount of alcohol or a customary wetting agent, adding 4 ccs. of concentrated hydrochloric acid and, if necessary, heating somewhat. The mixture is advantageously left to stand for a quarter of an hour and then diluted with water to the required volume. After the excess of acid has been neutralized—Congo red paper should no longer be turned blue—the solution is ready for developing the dyestuff. A red dyeing is produced corresponding to the red obtained from 2.3-hydroxynaphthoic acid-α-naphthalide and m-nitro-o-toluidine.

*Example 2.*—The materials are impregnated as described in Example 1 and developed in a solution, containing per liter 3 grams of the piperidine compound of diazodianisidine, dissolved in the manner disclosed in Example 1. Towards the completion of the dyestuff formation the acid is neutralized with sodium bicarbonate. A blue is produced.

*Example 3.*—4 grams of 2.3-hydroxynaphthoic acid-β-naphthalide are dissolved in the known manner with Turkey red oil and caustic soda lye to make a solution of 1000 cc. and 50 grams of cotton are impregnated in the customary manner with this solution for half an hour at about 30° C. The well centrifuged material is then developed in a bath containing per liter 1.7 grams of the dimethylamine compound of diazotized 2-methyl-4-chloro-aniline. The dimethylamine compound is dissolved by producing a paste of the same with a small amount alcohol, adding 4 ccm. of concentrated hydrochloric acid. The mixture is advantageously left to stand for a quarter of an hour and then diluted with water to 1 liter.

The excess of acid is neutralized by the addition of sodium acetate solution of 20% strength—Congo red paper should no longer be turned blue—and the solution is now ready for developing the dyestuff. A bluish-red shade is obtained.

*Example 4.*—50 grams of cotton are impregnated with a β-naphthol-solution as described in Example 3, and developed in a solution containing per liter 3 grams of the cyclohexyl-ethyl-amine compound of diazotized para-nitro-aniline in the same manner as described in Example 3. A red dyeing is produced.

The parts given in the following claims are by weight.

I claim:—

1. The process of preparing diazo baths suitable for use in the art of producing azo dyestuffs on the fiber which process comprises acidifying a compound of the general formula:

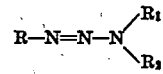

wherein R stands for a radical of the benzene series containing no sulfonic acid and no carboxylic acid groups, and $R_1$ and $R_2$ stand for alkyl, cyclohexyl, or $R_1$ and $R_2$ jointly stand for a penta-methylene chain, with hydrochloric acid, diluting the mixture with water and neutralizing the same with sodium acetate.

2. The process of preparing diazo baths suitable for use in the art of producing azo dyestuffs on the fiber, which process comprises acidifying a compound of the general formula:

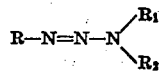

wherein R stands for a radical of the benzene series containing no sulfonic acid and no carboxylic acid groups, and $R_1$ and $R_2$ stand for alkyl groups, with hydrochloric acid, diluting the mixture with water and neutralizing the same with sodium acetate.

3. The process of preparing diazo baths suitable for use in the art of producing azo dyestuffs on the fiber, which process comprises acidifying a compound of the general formula:

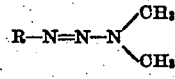

wherein R stands for a radical of the benzene series containing no sulfonic acid and no carboxylic acid groups, with hydrochloric acid, diluting the mixture with water and neutralizing the same with sodium acetate.

4. The process of preparing diazo baths suitable for use in the art of producing azo dyestuffs on the fiber, which process comprises acidifying a compound of the general formula:

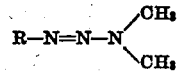

wherein R stands for a benzene nucleus which may be substituted by halogen, alkyl-, alkoxy- or nitro-groups, with hydrochloric acid, diluting the mixture with water and neutralizing the same with sodium acetate.

5. The process of preparing diazo baths suitable for use in the art of producing azo dyestuffs on the fiber, which process comprises acidifying a compound of the general formula:

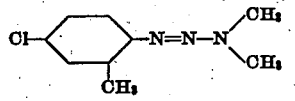

with hydrochloric acid, diluting the mixture with water and neutralizing the same with sodium acetate.

6. The process of preparing diazo baths suitable for use in the art of producing azo dyestuffs on the fiber, which process comprises acidifying about 1 to 3 parts of a compound of the general formula:

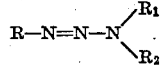

wherein R stands for a radical of the benzene series containing no sulfonic acid and no carboxylic acid groups, and $R_1$ and $R_2$ stand for alkyl, cyclohexyl, or $R_1$ and $R_2$ jointly stand for a penta-methylene chain, with concentrated hydrochloric acid, making up the mixture with water to about 1000 parts and neutralizing the same with sodium acetate.

7. The process of preparing diazo baths suitable for use in the art of producing azo dyestuffs on the fiber, which process comprises acidifying about 1 to 3 parts of a compound of the general formula:

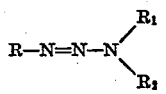

wherein R stands for a radical of the benzene series containing no sulfonic acid and no carboxylic acid groups, $R_1$ and $R_2$ stand for alkyl groups, with concentrated hydrochloric acid, making up the mixture with water to about 1000 parts and neutralizing the same with sodium acetate.

8. The process of preparing diazo baths suitable for use in the art of producing azo dyestuffs on the fiber, which process comprises acidifying about 1 to 3 parts of a compound of the general formula:

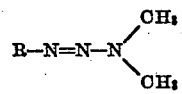

wherein R stands for a radical of the benzene series containing no sulfonic acid and no carboxylic acid groups, with concentrated hydrochloric acid, making up the mixture with water to about 1000 parts and neutralizing the same with sodium acetate.

9. The process of preparing diazo baths suitable for use in the art of producing azo dyestuffs on the fiber, which process comprises acidifying about 1 to 3 parts of a compound of the general formula:

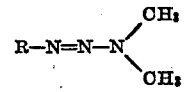

wherein R stands for a benzene nucleus which may be substituted by halogen, alkyl-, alkoxy- or nitro-groups, with concentrated hydrochloric acid, making up the mixture with water to about 1,000 parts and neutralizing the same with sodium acetate.

10. The process of preparing diazo baths suitable for use in the art of producing azo dyestuffs on the fiber, which process comprises acidifying 1 to 3 parts of a compound of the formula:

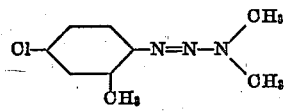

with concentrated hydrochloric acid, making up the mixture with water to about 1,000 parts and neutralizing the same with sodium acetate.

11. The process of preparing diazo baths suitable for us in the art of producing azo dyestuffs on the fiber, which process comprises acidifying 1.7 parts of a condensation product of dimethylamine with diazotized 2-methyl-4-chloro-aniline with 5 parts of concentrated hydrochloric acid, making up the mixture with water to about 1,000 parts and neutralizing the same with sodium acetate.

In testimony whereof I have hereunto set my hand.

CARL TAUBE. [L. S.]